(12) United States Patent
Sharpe et al.

(10) Patent No.: US 7,962,344 B2
(45) Date of Patent: Jun. 14, 2011

(54) DEPICTING A SPEECH USER INTERFACE VIA GRAPHICAL ELEMENTS

(75) Inventors: Timothy D. Sharpe, Redmond, WA (US); Cameron A. Etezadi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 11/824,495

(22) Filed: Jun. 29, 2007

(65) Prior Publication Data

US 2009/0006099 A1   Jan. 1, 2009

(51) Int. Cl.
G10L 21/00 (2006.01)

(52) U.S. Cl. ........ 704/275; 704/260; 704/270; 704/257; 715/729; 715/768; 379/88.28; 706/11

(58) Field of Classification Search .......... 704/275, 704/260, 270, 231, 257; 715/729, 202, 835, 715/978, 700, 808, 973, 764, 788; 379/88.28; 379/88.13; 706/11
See application file for complete search history.

(56) References Cited

U.S. PATENT DOCUMENTS

| | | | | |
|---|---|---|---|---|
| 5,606,702 | A * | 2/1997 | Diel et al. ...................... | 719/329 |
| 5,664,061 | A * | 9/1997 | Andreshak et al. ............ | 704/275 |
| 5,864,815 | A * | 1/1999 | Rozak et al. ................... | 704/275 |
| 5,959,626 | A * | 9/1999 | Garrison et al. ............... | 715/784 |
| 5,983,190 | A * | 11/1999 | Trower et al. .................. | 704/276 |
| 6,012,030 | A * | 1/2000 | French-St. George et al. .............................. | 704/275 |
| 6,128,011 | A * | 10/2000 | Peng .............................. | 715/744 |
| 6,208,972 | B1 * | 3/2001 | Grant et al. .................... | 704/275 |
| 6,233,560 | B1 * | 5/2001 | Tannenbaum ................. | 704/275 |
| 6,233,570 | B1 * | 5/2001 | Horvitz et al. .................. | 706/11 |
| 6,246,990 | B1 * | 6/2001 | Happ ............................. | 704/275 |
| 7,036,080 | B1 | 4/2006 | James et al. ................... | 715/728 |
| 7,299,185 | B2 | 11/2007 | Falcon et al. .................. | 704/270 |
| 7,363,229 | B2 | 4/2008 | Falcon et al. .................. | 704/275 |
| 7,412,391 | B2 | 8/2008 | Nakagawa et al. ............. | 704/270 |
| 2004/0236574 | A1 | 11/2004 | Ativanichayaphong et al. ............................. | 704/231 |
| 2005/0071171 | A1 | 3/2005 | Dvorak .......................... | 704/275 |
| 2006/0117265 | A1 | 6/2006 | Omi et al. ....................... | 715/762 |
| 2007/0233495 | A1 | 10/2007 | Agapi et al. .................... | 704/270 |

OTHER PUBLICATIONS

Anegg et al., "Multimodal Interfaces in Mobile Devices—The MONA Project", http://mona.ftw.at/papers/MobEAII-Paper_6.pdf, Published Date: 2004, 6 pp.

Sienel et al., "Multimodal Interaction for Next Generation Networks", http://www.w3.org/2004/02/mmi-workshop/Sienel-alcatel.pdf, Published Date: 2004, 3 pp.

* cited by examiner

*Primary Examiner* — Vijay B Chawan
(74) *Attorney, Agent, or Firm* — Merchant & Gould

(57) ABSTRACT

Depiction of a speech user interface via graphical elements is provided. One or more bits of a graphical user interface bitmask are re-designated as speech bits. When a software application processes the re-designated speech bits, a window manager responsible for generating and rendering a graphical user interface for the application passes information to a secondary window manager responsible for generating and rendering a speech user interface. The secondary speech window manager may load a text-to-speech engine, a speech recognizer engine, a lexicon or library of recognizable words or phrases and a set of "grammars" (recognizable words and phrasing) for building a speech user interface that will receive, recognize and act on spoken input to the associated software application.

20 Claims, 6 Drawing Sheets

DEPICTING A SPEECH USER INTERFACE VIA GRAPHICAL ELEMENTS

BACKGROUND

Current speech interfaces are crafted through a number of different application programming interfaces (API). Typically, these APIs require a programmer to learn one or more complex scripting languages in order to form "grammars," which are structured documents describing an interaction between a user and an interactive speech application. One of the limiting factors in widespread adoption of speech user interfaces by end user application developers is the high barrier of entry incurred by the necessity to learn one or more of these scripting languages. Furthermore, the speech interfaces themselves are often very complex and involve a requirement for a level of sophistication with language and speech beyond what the average application developer either possesses or desires.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing depiction of a speech user interface via graphical elements. A bitmask, for example, a 32 bit graphical user interface bitmask, is identified for providing a graphical user interface subsystem of a software application instructions on how to create and render the graphical user interface window and any sub-windows (or, child windows). One or more bits of the graphical user interface bitmask are re-designated as speech bits. When a software application processes the re-designated speech bits in the graphical user interface bitmask, a window manager responsible for generating and rendering a graphical user interface according to the graphical user interface bitmask passes information to a secondary window manager responsible for generating and rendering a speech user interface. The secondary speech window manager may load a text-to-speech engine, a speech recognizer engine, a lexicon or library of recognizable words or phrases and a set of "grammars" (recognizable words and phrasing) for building a speech user interface that will receive, recognize and act on spoken input to the associated software application. If desired, the speech window manager may call on the primary visual window manager to have a visual graphical user interface generated and rendered that is operatively associated with the speech user interface.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
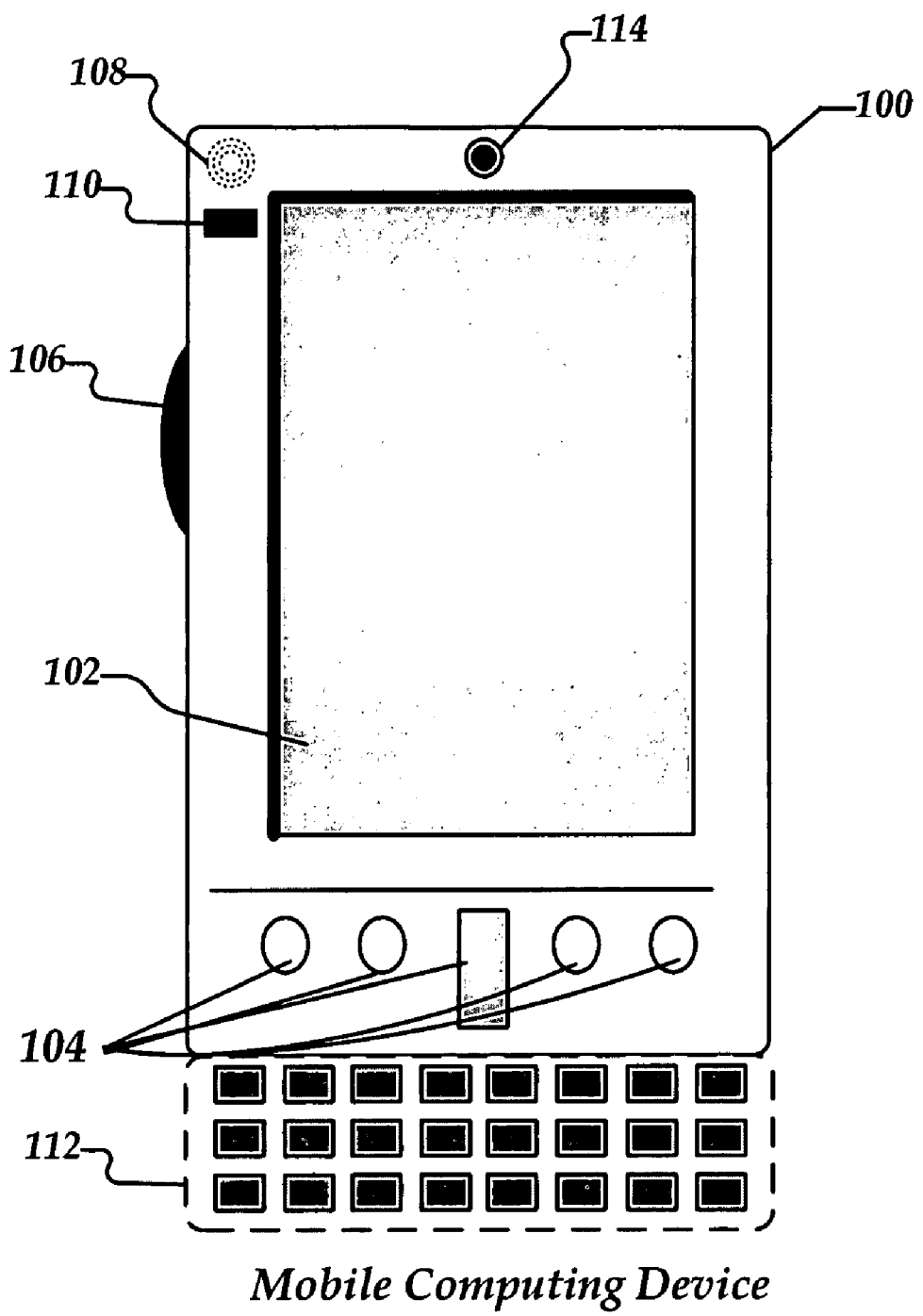
FIG. 1 is a diagram of an example mobile telephone/computing device.

As briefly described above, embodiments of the present invention are directed to depicting a speech user interface via graphical elements. According to embodiments, an extension of a graphical user interface (GUI) construction paradigm to aural controls through the re-mapping of existing window control messages is provided. Enabling and disabling windows, for example, is a cue to a computer operating system as to what audible speech controls are available. An associated speech recognition function may then have its recognition grammar modified dynamically by the controls active on the screen, whether visibly displayed or not. Individual windows and/or dialogs may activate and deactivate in order to signal an application that a recognition event has begun or concluded for a particular dialog item. A simplest type of recognition is performed via static text controls, which are static text items submitted for speech recognition. Situations which involve more complex grammars may be represented by choices in a list box or combination (combo) box control. As will be described below, a speech user interface according to embodiments of the invention may provide components that enable each of these types of speech-based input.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention may be utilized for both mobile and wired telephones. For purposes of illustration, embodiments of the present invention will be described herein with reference to a mobile telephone 100 having a telephone system 200, but it should be appreciated that the components described for the mobile telephone 100 with its mobile telephone system 200 are equally applicable to a wired telephone having similar or equivalent functionality for providing unique call announcements described herein.

The following is a description of a suitable mobile device, for example, the camera phone or camera-enabled computing device, discussed above, with which embodiments of the invention may be practiced. With reference to FIG. 1, an example mobile computing device 100 for implementing the embodiments is illustrated. In a basic configuration, mobile computing device 100 is a handheld computer having both input elements and output elements. Input elements may include touch screen display 102 and input buttons 104 and allow the user to enter information into mobile computing device 100. Mobile computing device 100 also incorporates a side input element 106 allowing further user input. Side input element 106 may be a rotary switch, a button, or any other type of manual input element. In alternative embodiments, mobile computing device 100 may incorporate more or less input elements. For example, display 102 may not be a touch screen in some embodiments. In yet another alternative embodiment, the mobile computing device is a portable phone system, such as a cellular phone having display 102 and input buttons 104. Mobile computing device 100 may also include an optional keypad 112. Optional keypad 112 may be a physical keypad or a "soft" keypad generated on the touch screen display. Yet another input device that may be integrated to mobile computing device 100 is an on-board camera 114.

Mobile computing device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

Figure 2:
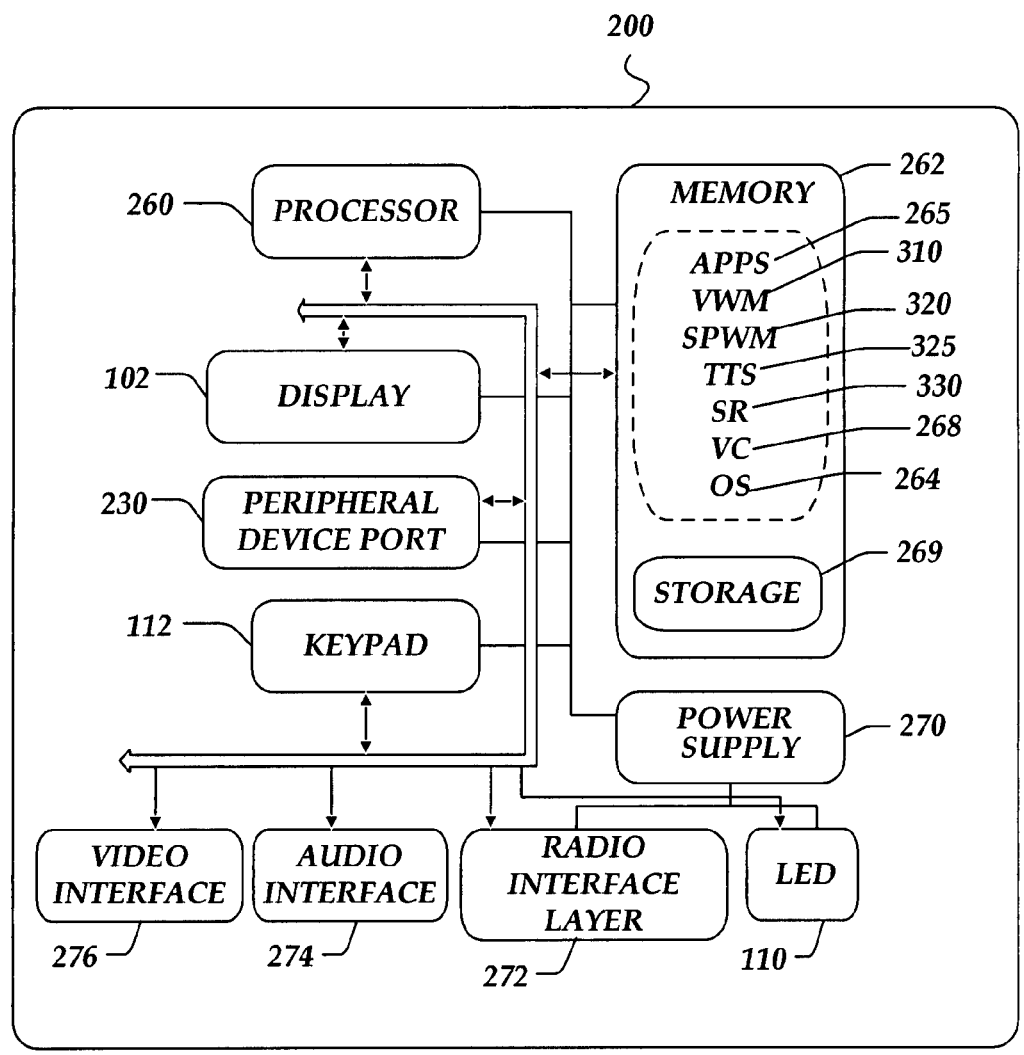
FIG. 2 is a block diagram illustrating components of a mobile telephone/computing device that may serve as an operating environment for the embodiments of the invention.

FIG. 2 is a block diagram illustrating components of a mobile computing device used in onetel embodiment, such as the mobile telephone/computing device 100 illustrated in FIG. 1. That is, mobile computing device 100 (FIG. 1) can incorporate system 200 to implement some embodiments. For example, system 200 can be used in implementing a "smart phone" that can run one or more applications similar to those of a desktop or notebook computer such as, for example, browser, email, scheduling, instant messaging, and media player applications. System 200 can execute an Operating System (OS) such as, WINDOWS XP®, WINDOWS MOBILE 2003® or WINDOWS CE® available from MICROSOFT CORPORATION, REDMOND, WASHINGTON. In some embodiments, system 200 is integrated as a computing device, such as an integrated personal digital assistant (PDA) and wireless phone.

In this embodiment, system 200 has a processor 260, a memory 262, display 102, and keypad 112. Memory 262 generally includes both volatile memory (e.g., RAM) and non-volatile memory (e.g., ROM, Flash Memory, or the like). System 200 includes an Operating System (OS) 264, which in this embodiment is resident in a flash memory portion of memory 262 and executes on processor 260. Keypad 112 may be a push button numeric dialing pad (such as on a typical telephone), a multi-key keyboard (such as a conventional keyboard), or may not be included in the mobile computing device in deference to a touch screen or stylus. Display 102 may be a liquid crystal display, or any other type of display commonly used in mobile computing devices. Display 102 may be touch-sensitive, and would then also act as an input device.

One or more application programs 265 are loaded into memory 262 and run on or outside of operating system 264. Examples of application programs include phone dialer programs, e-mail programs, PIM (personal information management) programs, such as electronic calendar and contacts programs, word processing programs, spreadsheet programs, Internet browser programs, and so forth. System 200 also includes non-volatile storage 268 within memory 262. Non-volatile storage 269 may be used to store persistent information that should not be lost if system 200 is powered down. Applications 265 may use and store information in non-volatile storage 269, such as e-mail or other messages used by an e-mail application, contact information used by a PIM, documents used by a word processing application, and the like. A synchronization application (not shown) also resides on system 200 and is programmed to interact with a corresponding synchronization application resident on a host computer to keep the information stored in non-volatile storage 269 synchronized with corresponding information stored at the host computer. In some embodiments, non-volatile storage 269 includes the aforementioned flash memory in which the OS (and possibly other software) is stored.

The visual window manager (VWM) 310 is a software application module operative to construct a visual user interface and to coordinate combination and display of components of a visual user interface. The speech window manager (SPWM) 320 is a software application module operative to construct a speech user interface and to coordinate combination and deployment of components of a speech user interface as described below.

The text-to-speech (TTS) engine 325 is a software application operative to receive text-based information and to generate an audible announcement from the received information. As is well known to those skilled in the art, the TTS engine 266 may access a large lexicon or library of spoken words, for example, names, places, nouns, verbs, articles, or any other word of a designated spoken language for generating an audible announcement for a given portion of text. The lexicon of spoken words may be stored at storage 269. According to embodiments of the present invention, once an audible announcement is generated from a given portion of text, the audible announcement may be played via the audio interface 274 of the telephone/computing device 100 through a speaker, earphone or headset associated with the device 100.

The speech recognition (SR) module 330 is a software application operative to receive an audible input from a called or calling party and for recognizing the audible input for use in call disposition by the ICDS 300. Like the TTS engine 325, the speech recognition module may utilize a lexicon or library of words it has been trained to understand and to recognize.

The voice command (VC) module 268 is a software application operative to receive audible input at the device 100 and to convert the audible input to a command that may be used to direct the functionality of the device 100. According to one embodiment, the voice command module 268 may be comprised of a large lexicon of spoken words, a recognition function and an action function. The lexicon of spoken words may be stored at storage 269. When a command is spoken into a microphone of the telephone/computing device 100, the voice command module 268 receives the spoken command and passes the spoken command to a recognition function that parses the spoken words and applies the parsed spoken words to the lexicon of spoken words for recognizing each spoken word. Once the spoken words are recognized by the recognition function, a recognized command, for example, "forward this call to Joe," may be passed to an action functionality that may be operative to direct the call forwarding activities of a mobile telephone/computing device 100.

System 200 has a power supply 270, which may be implemented as one or more batteries. Power supply 270 might further include an external power source, such as an AC adapter or a powered docking cradle that supplements or recharges the batteries.

System 200 may also include a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 265 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 200 is shown with two types of notification output devices. The LED 110 may be used to provide visual notifications and an audio interface 274 may be used with speaker 108 (FIG. 1) to provide audio notifications. These devices may be directly coupled to power supply 270 so that when activated, they remain on for a duration dictated by the notification mechanism even though processor 260 and other components might shut down for conserving battery power. LED 110 may be programmed to remain on indefinitely until the user takes action to indicate the powered-on status of the device. Audio interface 274 is used to provide audible signals to and receive audible signals from the user. For example, in addition to being coupled to speaker 108, audio interface 274 may also be coupled to a microphone to receive audible input, such as to facilitate a telephone conversation. In accordance with embodiments of the present invention, the microphone may also serve as an audio sensor to facilitate control of notifications, as will be described below.

System 200 may further include video interface 276 that enables an operation of on-board camera 114 (FIG. 1) to record still images, video stream, and the like. According to some embodiments, different data types received through one of the input devices, such as audio, video, still image, ink entry, and the like, may be integrated in a unified environment along with textual data by applications 265.

A mobile computing device implementing system 200 may have additional features or functionality. For example, the device may also include additional data storage devices (removable and/or non-removable) such as, magnetic disks, optical disks, or tape. Such additional storage is illustrated in FIG. 2 by storage 269. Computer storage media may include volatile and nonvolatile, removable and non-removable media implemented in any method or technology for storage of information, such as computer readable instructions, data structures, program modules, or other data.

Figure 3:
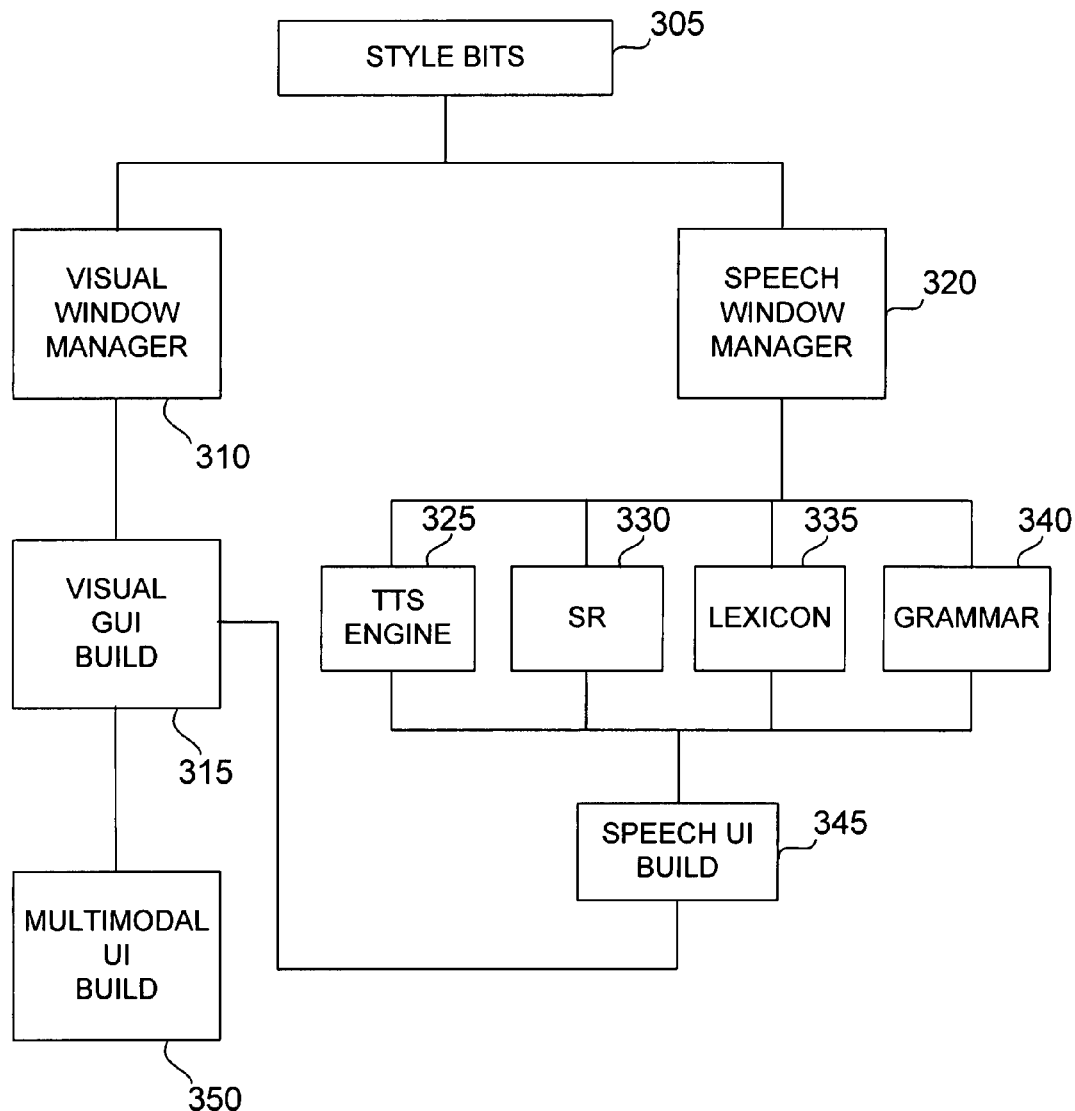
FIG. 3 is a simplified block diagram illustrating a system architecture for depicting a speech user interface via graphical elements.

FIG. 3 is a simplified block diagram illustrating a system architecture for depicting a speech user interface via graphical elements. According to embodiments of the present invention, a speech user interface is generated and rendered by re-purposing components of a visual graphical user interface generation and rendering method for generating and rendering a visual dialog and associated dialog resources (elements and objects which define the look of a dialog on screen) for rendering a speech user interface (SUI) in a semi-autonomous manner. That is, according to embodiments, speech user interface components may be generated by repurposing discrete, pre-existing visual user interface elements to map directly to known grammar constructs. Thus, a user interface development paradigm familiar to graphical user interface developers may be used to map speech grammars to known GUI elements, as described below.

Referring to FIG. 3, according to embodiments, a standard dialog structure for a visual graphical user interface (GUI) contains a 32-bit value 305 often referred to as the "style bits." These bits provide additional information to a GUI subsystem of the computer 100 to aide the computer in rendering a visual window on the screen of the computer 100. These bits 305 typically refer to such visual aspects of the window as border types, whether the window should initially be minimized, whether the window is a dialog box, pop up box, or drop down menu, whether the window has a system menu, and so on. For the generation and rendering of a visual GUI, the settings of the style bits 305 are passed to or obtained by a visual window manager 310 which in turn generates a visual GUI build 315 that includes the graphical user interface components to allow a user to interact with an associated software application by selecting (e.g., clicking on) one or more graphical elements contained in the GUI build.

Referring still to FIG. 3, according to embodiments of the invention, one or more of the style bits bitmask 305 may be designated as a speech bit for indicating to the window manager of the operating system 264 of the computer 100 that the responsibility for generating and rendering the present user interface window should be passed to a speech window manager 320 for generating and rendering a speech user interface (SUI), as described herein. For example according to a MICROSOFT WINDOWS based operating system 264 used for the mobile computing device 100, a bit in the bitmask 305 may be designated as "WS_SPEECH" for indicating to the speech window manager 320 that the present user interface window should be generated and rendered as a speech user interface. When the speech window manager 320 obtains or receives the style bits bitmask 305 with the one or more bits designated as speech bits, the speech window manager 320 organizes all components necessary for generating and rendering a speech user interface for allowing a user to interact with an associated software application via speech as opposed to physical interaction, for example, clicking on a graphical user interface component.

According to an embodiment, the rendering representation of the remaining bits in the bitmask 305 also may be interpreted by the speech subsystem (speech window manager 320). For example, this allows the rendering of message box items as questions, or allows the aural distinguishing of modal or top-level user interface dialogs from other features of the user interface.

According to one embodiment, the speech window manager 320 calls a text-to-speech engine 325 and designates the text-to-speech (TTS) engine 325 for generating speech input or output from associated text strings needed for the speech user interface being built. The speech window manager calls the speech recognition module 330 and designates the speech recognition module 330 for receiving spoken input via the speech user interface being built and for recognizing the spoken input for use in processing a data or command input received from a user of the speech user interface.

The speech window manager 320 obtains a lexicon 335 (or, library) of words or phrases that may be used by the text-to-speech engine 325 and the speech recognition engine 330 for generating and recognizing speech. A grammar library 340 is obtained by the speech recognition manager 320 for providing recognizable grammatical phrases and words that may be received via the speech user interface being built by speech window manager 320. For example, grammatical phrases that may be provided via the grammar module 340 include typical command phrases such as "open file," "call office," "save this file," and the like.

After the speech window manager 320 obtains the components 325, 330, 335, 340 necessary for generating an associated speech user interface, the speech user interface build 345 is generated. If it is desired that a visual graphical user interface should be generated that will show a visual representation of the components of the speech user interface build 345, the speech window manager 320 may pass the speech user interface build 345 back to the visual window manager 310 for building a visual graphical user interface 315 associated with the speech user interface build 345 or for generating a multi-modal user interface build 350 that contains components of a standard visual graphical user interface and components of a speech user interface, where the components of the standard visual graphical user interface may be selected by a physical action, for example, clicking on a component of the visual graphical user interface and where components of the speech user interface are selected via spoken input/command.

According to embodiments, by allowing a speech bit to be set on a per window basis, an associated dialog or window is provided the opportunity to effectively integrate speech controls into a normal visual user interface. For instance, a dialog might display static text and list boxes on the screen, but have a separate set of list boxes and static text that is rendered only in audio output. Alternatively, entire applications may have speech bits, for example "WS_SPEECH" set upon top level windows of the respective applications, forcing all child windows rendered beyond that point to be de facto speech controls.

A speech user interface build 345 need not have an associated visual build. That is, the speech user interface build need not be rendered as a visual window that may be displayed on a screen of the computing device 100. Thus, such a speech user interface that is not visually rendered on the screen of the computing device 100 will be reactive to spoken input, but visual representation of user interface components prior to or responsive to the spoken input need not be displayed. This is particularly advantageous when the speech user interface build 345 is utilized on a mobile computing device 100 where only a single user interface window may be displayed at a time, or on computing device where it is desired that a presently in use top-level application user interface remain visually displayed without being replaced by a second user interface.

For example, if a user is working on a word processing document in a user interface associated with a word processing application, the user may desire to launch an instance of a telephone application for commanding the telephone application to dial a colleague for a discussion about the word processing document being edited. If a speech user interface build 345 associated with the desired telephone application is not rendered as a visual window, then the user may speak telephone dialing commands into her computing device 100 for launching, activating and utilizing the associated telephone application while her word processing application user interface and any document displayed therein remain displayed on the screen of her computing device 100. Thus, the speech user interface build 345 does not replace the visual user interface of the example word processing application as a top-level user interface which would require the user to toggle back to the word processing user interface after the telephone dialing operation is complete.

Figure 4:
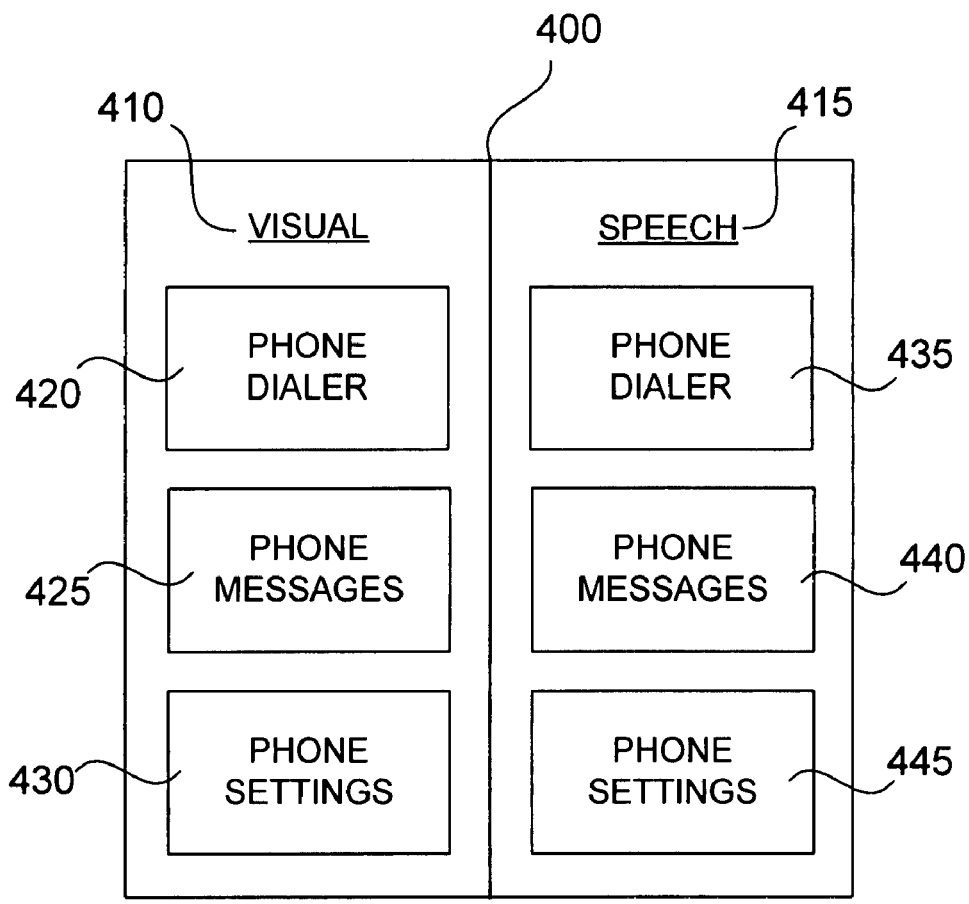
FIG. 4 is an illustration of a multi-modal graphical user interface having components of a visual graphical user interface and components of a speech graphical user interface.

A multi-modal user interface 400 is illustrated in FIG. 4 showing a visual graphical user interface section 410 and a speech user interface section 415. For purposes of illustration, the user interface 400 shows example user interface components associated with a telephone application that may be used on a mobile computing device 100 such as a mobile telephone/personal digital assistant. As should be appreciated, the user interface 400 is for purposes of illustration only and is not limiting of the vast number of user interface components that may be generated and rendered according to embodiments of the invention.

The user interface 400 illustrates a multi-modal user interface in which both visual graphical user interface components 420, 425, 430 and speech user interface components 435, 440, 445 are rendered. The visual user interface components 420, 425, 430 are actuated by physically selecting the components using a user interface selection method such as a mouse click, electronic pen depression, stylus depression, keyboard entry, and the like. The speech user interface components 435, 440, 445 are actuated by spoken input. For example, if the user wishes to select the phone dialer graphical user interface component 420, the user may select the component using a mouse click, electronic pen depression, stylus depression, keyboard entry, and the like for obtaining the underlying functionality of the associated telephone application associated with the phone dialer button 420. If the phone dialer button 420 is thus selected, a secondary graphical user interface may be displayed, as described below with respect to FIG. 5 for allowing the user to dial one or more contacts or for entering a telephone directory number for dialing a desired contact. Similarly, the phone messages button 425 may allow a user to selectively launch a phone messages component of the telephone application, and a phone settings button 430 may allow the user to launch a phone settings component of the associated telephone application.

To illustrate the association of the visual user interface components with the speech user interface components, matching speech user interface components 435, 440, 445 are illustrated in the speech section 415 of the user interface 400. Accordingly, if the user desires to select the phone dialer functionality of the associated telephone application, the user may speak the associated command, for example "phone dialer." In response to the spoken command, the speech recognizer engine 330, described above with reference to FIG. 3, may intercept the spoken command and may use the lexicon/library 335 and the grammar library 340 to recognize the meaning of the user's spoken command. Once the user's spoken command is recognized as a command to launch the phone dialer functionality of the associated telephone application, then that functionality is provided to the user in the same manner as it would be provided to the user by physically selecting the phone dialer button 420 from the visual graphical user interface section 410, including the provision of any additional graphical user interface components associated with the selected functionality, as described below with reference to FIG. 5. The illustration of visual user interface components and corresponding speech user interface components is not intended to represent parity between the two type of components, but is intended to illustrate that speech user interface components may be repurposed from pre-existing visual user interface elements and may be mapped to associated speech grammar constructs As described above, according to embodiments, there is no necessity for visually representing the speech recognition user interface components 435, 440, 445. That is, according to one embodiment, the user may speak a top-level command such as "telephone application" which will be recognized by the speech recognition module 330, followed by a provision of the speech user interface components 435, 440, 445 to the user without actually displaying a visual user interface 400 on the display screen of the user's mobile computing device 100. That is, according to this embodiment, once the top-level functionality of the desired application, for example, the telephone application, is retrieved, the speech user interface components 435, 440, 445 are available to the user for receiving spoken commands without having to actually display a visual representation of the speech user interface components.

Alternatively, a visual representation of the speech user interface components may be generated, as illustrated in FIG. 4. In some cases, some users prefer a visual representation of user interface components, even if those user interface components are actuated via spoken command. In the case of a multi-modal user interface 400 as illustrated in FIG. 4, those user interface components requiring physical interaction between the user and the associated software application may be displayed as illustrated in the visual user interface section 410, and those components requiring spoken interaction may be displayed in the speech user interface section 415. On the other hand, if a single set of user interface components are available to the associated software application, then a single set of functionality buttons or controls may be displayed which may be physically selected, for example, by mouse click, or that may be actuated via spoken command. That is, rather than displaying identical functionality buttons or controls in both a visual user interface section 410 and in a speech user interface section 415, as illustrated in FIG. 4, a single set of the functionality buttons or controls 420, 425, 430 may be displayed in the user interface 400 which may be actuated by physical interaction, for example, by mouse click, or which may be actuated by a spoken command, for example, by uttering the words "phone dialer."

Figure 5:
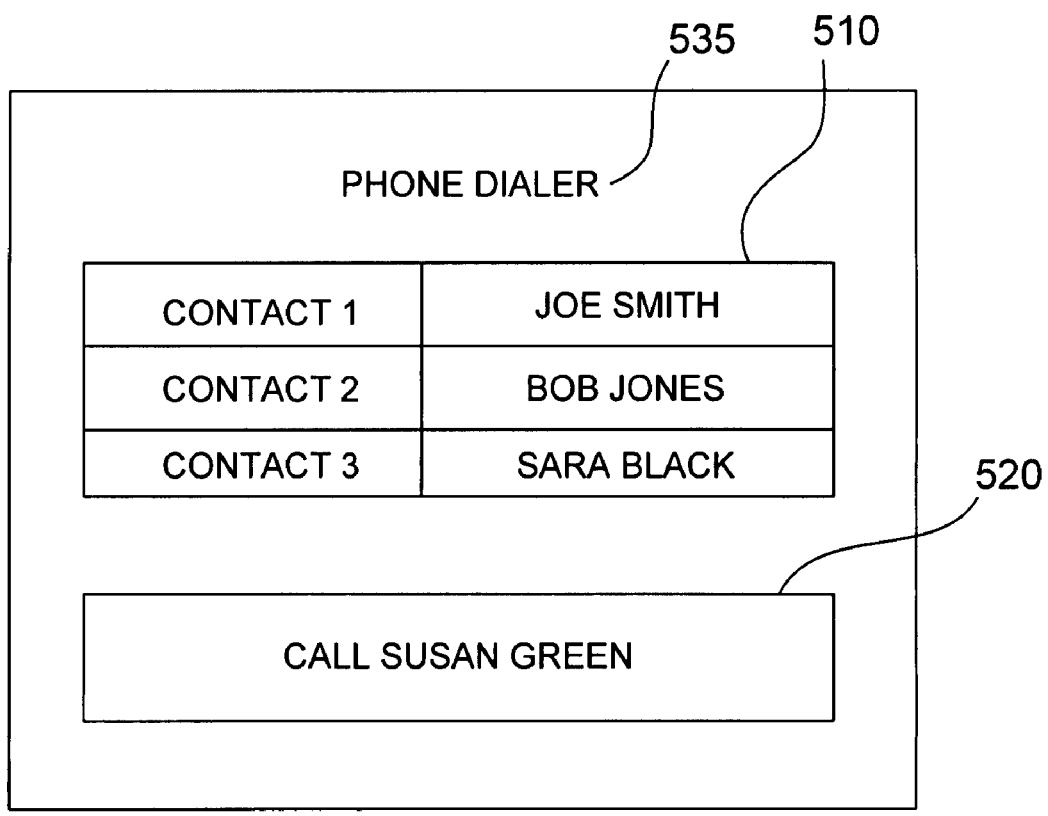
FIG. 5 illustrates a graphical user interface associated with a speech user interface.

Spoken input typically takes the form of a voice tag, for example, the speaking of a predetermined tagged word or phrase, for example, "phone dialer," or command and control utterances, for example, the speaking of a phrase such as "call Joe Smith," which includes words and phrases requiring the recognition of commands and voice tags, or dictation wherein a user dictates a spoken word, phrase or command which must be recognized by the speech recognition module 330 for use in directing the functionality of the associated software application. The user interface 535 illustrated in FIG. 5 shows example operation of each of these three types of spoken input. The user interface 535 is an example child user interface window launched in response to a spoken selection of the phone dialer user interface component 435 illustrated in Figure.

A voice tag such as "phone dialer" may be recognized as associated with the particular sub-system of the example telephone application for providing dialing services on an example mobile telephone 100. The list box 510 illustrates a list of complex grammars that may be available and that may be recognized by the speech recognition module 330. For example, the list box 510 may include complex command and control grammars, such as "call Joe Smith at his office," or "dial Bob Jones at his home." Such a list of complex grammars may be generated by a developer of the associated software application for allowing a recognition of these types of spoken commands to allow a user to speak in a seemingly free form manner, for example, by uttering the words "call Joe Smith at his office" in order to cause the associated the telephone application to obtain an office telephone number for the desired called party and for causing the associated telephone application to place the call. An edit box 520 is illustrated for receiving free flowing spoken dictation that may be recognized by the speech recognition module 330 for causing an actuation of a desired functionality. For example, a user may dictate the words "call Susan Green," as illustrated in the edit box 520, for causing the speech recognition module 330 to recognize the spoken words even though the spoken words are not part of a previously designed complex grammar or voice tag, as described above.

As described above, the user interface 535, which represents a child window of the user interface 400, may be displayed visually, as illustrated in FIG. 5, or the components of the window 535 may simply be available for speech actuation without actually displaying the components in a window on a display screen of the computing device 100. If the components of the example user interface 535 are visually displayed, as illustrated in FIG. 5, then a user may, in effect, read information from the visual display as spoken commands. For example, the user may simply speak a contacts name such as "Joe Smith" for causing an automatic dialing of the spoken contacts name via the associated telephone application. On the other hand, if the user begins dictating free form information, the user may be presented with a recognition of the free form dictation in the edit box 520 as the user is speaking the dictation. For example, as the user is speaking the words "call Susan Green," the user may see the spoken input being displayed in the edit box 520 which will allow the user to know whether her spoken utterance has been properly recognized by the speech recognition module 330.

On the other hand, if the speech window manager 310 has been configured such that the speech user interface components are not visually displayed, then the user's speech interaction with the speech user interface components will not include a visual representation of the user interface components. As should be appreciated, the speech user interface may be programmed to provide an aural response to spoken input to provide the user a responsive interaction with the speech user interface. For example, if the user utters the words "call Joe Smith," the speech user interface may be programmed to respond back to the user with a question such as "do you want to call Joe Smith?" The user may then be provided with a method for responding to the question such as by uttering the words "yes," or no.

Figure 6:
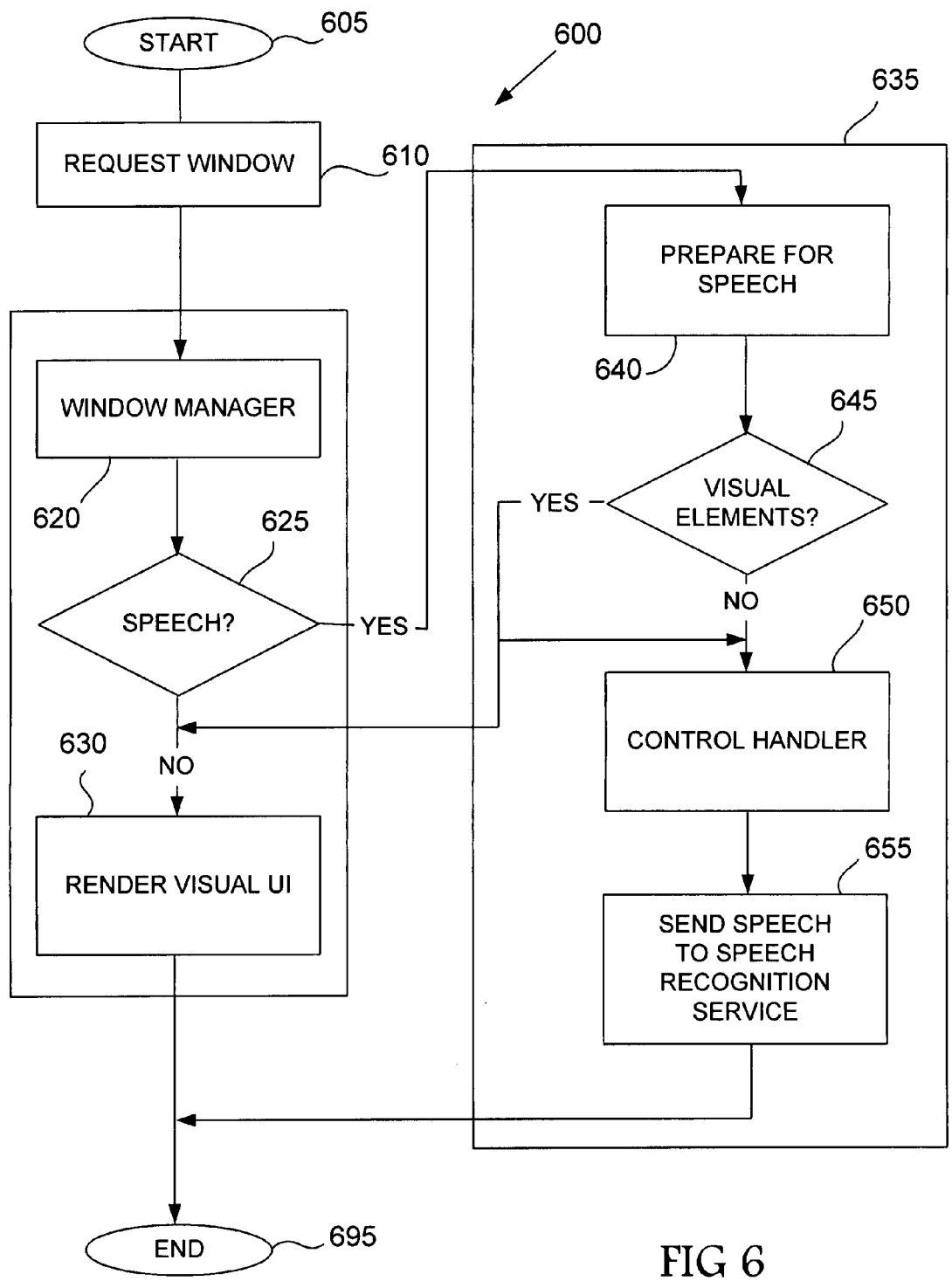
FIG. 6 is a logical flow diagram illustrating a method for depicting a speech user interface via graphical elements.

Having described exemplary operating environments and system architectures for embodiments of the present invention, it is advantageous to further describe embodiments of the present invention with respect to an example implementation of a method for depicting a speech user interface via graphical elements. FIG. 6 is a logical flow diagram illustrating a method for depicting a speech user interface via graphical elements. The routine 600, illustrated in FIG. 6, begins at start operation 605 and proceeds to operation 610 where a user interface window is requested from a window manager in response to a user action. For example, if a user of the example mobile computing device 100 selects a software application, for example, a word processing application, a spreadsheet application, a slide presentation application, a telephone application, an electronic calendaring application, and the like, a notification may be made to an operating system 264 of the computing device 100 that a window manager is needed for generating and rendering a graphical user interface window in response to the user action.

At operation 620, the visual window manager 310, illustrated in FIG. 3, is notified by the operating system 264 that a graphical user interface window is required because the user has selected a software application functionality associated with the rendering and display of a graphical user interface window. For example, a required graphical user interface window may include a workspace for drafting and editing a word processing document, a worksheet for entering and editing data in a spreadsheet document, or a user interface window for allowing a user to place telephone calls, as illustrated above with reference to FIGS. 4 and 5.

At operation 625, the visual window manager 310 parses the bitmask 305 to determine the "style bits" that are present for determining how a resulting graphical user interface window should be generated, rendered and displayed. For example, for a visual graphical user interface window, the style bits contained in the bitmask 305 may include information regarding the look, feel and layout, including border types, coloring, shading, etc. associated with the requested graphical user interface window. If at operation 625, the visual window manager 310 encounters a bit in the bitmask 305 that has been set to a speech bit, as described above, the routine proceeds to operation 640, and the visual window manager 310 passes control of the user interface generation and rendering operation to a speech window manager 320, as illustrated above with reference to FIG. 3.

According to an embodiment, if the visual window manager 310 passes responsibility for generating and rendering the requested user interface to the speech window manager 320, the passing of responsibility may be accomplished via an application programming interface (API) that may pass the speech bit encountered in the bitmask 305 to the speech window manager 320 as a parameter of the API. For example, the "WS_SPEECH" bit may be passed to the speech window manager 320 as a parameter of an API for notifying the speech window manager 320 of the requirement to generate the requested speech user interface.

At operation 640, the speech window manager 320 obtains all the required functionality and data required for generating a speech user interface according to the requested window. As described above with reference to FIG. 3, the speech window manager 320 obtains the services of a text-to-speech (TTS) engine 325 for converting text strings, a speech recognition module 330 is obtained for recognizing spoken input, and a lexicon of words and phrases 335 and a grammar library 340 are obtained for providing particular words, phrases and grammar required for the requested window. For example, as should be understood, a lexicon of known words and phrases, and required grammatical structures for a speech user interface for a telephone application may be dramatically different from the lexicon and grammar library required for a speech user interface for a word processing application. Thus, at operation 640, the speech window manager 320 obtains those resources necessary for generating and rendering a speech user interface applicable to the requested graphical user interface window.

At operation 645, a determination is made as to whether any visual elements are required for the requested speech user interface. For example, as described above with reference to FIGS. 4 and 5, if the user has configured the speech window manager 320 for providing a visual representation of the speech user interface components, then the visual user interface window manager 310 will be required to assist the speech window manager 320 in generating and rendering those components of the speech user interface that are to be displayed in a visual graphical user interface window. If visual elements are required, then the speech window manager 320 passes control of the generation of visual graphical user interface components back to the visual window manager 310, as illustrated in FIG. 6. According to one embodiment, if it is determined that visual elements are required for the requested speech user interface, a request for the generation and rendering of the necessary visual elements may be passed to the visual window manager 310 via an application programming interface (API) with which the requested visual components are passed to the visual window manager 310 as parameters of the API.

Whether the requested speech user interface has visual elements or not, the routine proceeds to operation 650, and a control handler is designated for processing events associated with the speech user interface. For example, when the speech user interface receives a spoken voice tag, command, or dictation, the control handler intercepts the event created by the spoken utterance and calls the appropriate component, for example, the TTS engine 325 or the speech recognition engine 330. For example, if a voice tag such as "phone dialer" is spoken by a user to the speech user interface, the event control handler will receive notification of the spoken voice tag as an event, and the speech recognition module 330 will be notified that its services are needed for recognizing the spoken voice tag for processing an associated functionality of the software application in use.

At operation 655, spoken information received via the speech user interface 415, 535 is received and is sent to speech recognition module 330 for processing as described herein. Likewise, any text-based communication to the speech user interface, for example, the selection of a text-based command contained in a user interface component 520 may be sent to a text-to-speech engine 325 for converting the text-based entry to a speech-based entry for use via the speech user interface.

If no visual elements are required for the requested speech user interface, the routine ends at operation 695, and the requested speech user interface is now available for receiving spoken input from a user. On the other hand, if visual elements are required for the requested speech user interface, or if at operation 625, a speech user interface bit is not encountered for the requested graphical user interface window, the routine proceeds to operation 630 and any visual components for the requested user interface are generated and are rendered to a display screen of the computing device 100, and the routine ends at operation 695.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of depicting a speech user interface, comprising:
   receiving a request for a user interface window;
   determining whether the request for a user interface window includes a request for a speech user interface window;
   if the request for a user interface window includes a request for a speech user interface window, assembling one or more components of the speech user interface window; and
   instantiating a speech user interface window comprised of the one or more speech user interface components for allowing interaction with an associated software application via speech commands, the instantiation of the speech user interface window comprising parsing a user interface bitmask associated with the received request to determine a plurality of style bits contained in the bitmask, the plurality of style bits comprising information regarding at least one of a look, feel and layout of the speech user interface window, the at least one of the look, feel and layout of the speech user interface window comprising border types, coloring and shading associated with the speech user interface window.

2. The method of claim 1, wherein receiving a request for a user interface window includes receiving a request for a user interface window in response to an indication of the launching of a software application functionality requiring a user interface window.

3. The method of claim 1, wherein receiving a request for a user interface window includes receiving the request for the user interface window at a visual user interface window manager.

4. The method of claim 1, wherein determining whether the request for a user interface window includes a request for a speech user interface window includes parsing the user interface bitmask associated with the received request and determining whether the user interface bitmask contains a speech user interface bit.

5. The method of claim 1, prior to assembling one or more components of the speech user interface window, passing a request for assembling the one or more components of the speech user interface window to a speech user interface window manager.

6. The method of claim 5, wherein passing a request for assembling the one or more components of the speech user interface window to a speech user interface window manager includes passing the request for assembling the one or more components of the speech user interface window to a speech user interface window manager via an application programming interface (API) wherein the request for assembling the one or more components of the speech user interface window are passed as a parameter of the API.

7. The method of claim 1, wherein assembling the one or more components of the speech user interface window comprises assembling a text-to-speech engine for converting text strings to an audible form and a speech recognition module for recognizing audible input.

8. The method of claim 7, further comprising:
   assembling a lexicon of words and phrases needed by the text-to-speech engine and the speech recognition module; and
   assembling a grammar library needed by the text-to-speech engine and the speech recognition module.

9. The method of claim 1, further comprising determining whether the requested user interface window includes one or more visual user interface components; and if the requested user interface window includes one or more visual user interface components, passing a request for assembling the one or more visual components to the visual user interface window manager.

10. The method of claim 9, wherein determining whether the requested user interface window includes one or more visual user interface components includes parsing the user interface bitmask associated with the received request and determining whether the user interface bitmask contains one or more visual user interface bits.

11. The method of claim 9, wherein passing a request for assembling the one or more visual components to the visual user interface window manager includes passing the request for assembling the one or more visual components to the visual user interface window manager via an application programming interface (API) wherein the request for assembling the one or more visual components is passed as a parameter of the API.

12. The method of claim 1, further comprising instantiating an event control handler for processing events associated with the one or more speech user interface components.

13. A computer readable medium containing computer executable instructions which when executed by a computer perform a method of depicting a speech user interface, comprising:
   receiving a request for a user interface window in response to an indication of the launching of a software application functionality requiring a user interface window;
   determining whether the request for a user interface window includes a request for a speech user interface window;
   if the request for a user interface window includes a request for a speech user interface window, passing a request for assembling the one or more components of the speech user interface window to a speech user interface window manager; and
   instantiating a speech user interface window comprised of the one or more speech user interface components for allowing interaction with an associated software application via speech commands, the instantiation of the speech user interface window comprising parsing a user interface bitmask associated with the received request to determine a plurality of style bits contained in the bitmask, the plurality of style bits comprising information regarding at least one of a look, feel and layout of the speech user interface window, the at least one of the look, feel and layout of the speech user interface window comprising border types, coloring and shading associated with the speech user interface window.

14. The computer readable medium of claim 13, wherein receiving a request for a user interface window includes receiving the request for the user interface window at a visual user interface window manager.

15. The computer readable medium of claim 13, wherein determining whether the request for a user interface window includes a request for a speech user interface window includes parsing the user interface bitmask associated with the received request and determining whether the user interface bitmask contains a speech user interface bit.

16. The computer readable medium of claim 13, wherein passing a request for assembling the one or more components of the speech user interface window to a speech user interface window manager includes passing the request for assembling the one or more components of the speech user interface window to a speech user interface window manager via an application programming interface (API) wherein the request for assembling the one or more components of the speech user interface window are passed as a parameter of the API.

17. The computer readable medium of claim 13, wherein prior to instantiating a speech user interface window comprised of the one or more speech user interface components for allowing interaction with an associated software application via speech commands, further comprising:
- assembling a text-to-speech engine for converting text strings to an audible form and a speech recognition module for recognizing audible input;
- assembling a lexicon of words and phrases needed by the text-to-speech engine and the speech recognition module; and
- assembling a grammar library needed by the text-to-speech engine and the speech recognition module.

18. The computer readable medium of claim 13, further comprising determining whether the requested user interface window includes one or more visual user interface components; and if the requested user interface window includes one or more visual user interface components, passing a request for assembling the one or more visual components to the visual user interface window manager.

19. A computer readable medium containing computer executable instructions which when executed by a computer perform a method of depicting a speech user interface, comprising:
- receiving a request for a user interface window;
- determining whether the request for a user interface window includes a request for a speech user interface window;
- if the request for a user interface window includes a request for one or more speech user interface components, assembling the one or more speech user interface components;
- if the requested user interface window includes one or more visual user interface components, assembling the one or more visual user interface components; and
- instantiating a user interface window comprised of the one or more speech user interface components for allowing interaction with an associated software application via speech commands and comprised of the one or more visual user interface components for allowing interaction with the associated software application via selection of the one or more visual user interface component, the instantiation of the speech user interface window comprising parsing a user interface bitmask associated with the received request to determine a plurality of style bits contained in the bitmask, the plurality of style bits comprising information regarding at least one of a look, feel and layout of the speech user interface window, the at least one of the look, feel and layout of the speech user interface window comprising border types, coloring and shading associated with the speech user interface window.

20. The computer readable medium of claim 19, wherein prior to instantiating a user interface window comprised of the one or more speech user interface components for allowing interaction with an associated software application via speech commands, further comprising:
- assembling a text-to-speech engine for converting text strings to an audible form and a speech recognition module for recognizing audible input;
- assembling a lexicon of words and phrases needed by the text-to-speech engine and the speech recognition module; and
- assembling a grammar library needed by the text-to-speech engine and the speech recognition module.

* * * * *